United States Patent
Baghel et al.

(10) Patent No.: US 10,791,465 B2
(45) Date of Patent: **\*Sep. 29, 2020**

(54) METHODS AND APPARATUS FOR ACTIVATING AND DEACTIVATING SECONDARY CELLS IN A CARRIER AGGREGATION ENVIRONMENT

(71) Applicant: Samsung Electronics Co., Ltd., Suwon-si, Gyeonggi-do (KR)

(72) Inventors: Sudhir Kumar Baghel, Bangalore (IN); Venkateswara Rao Manepalli, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,484

(22) Filed: Oct. 15, 2018

(65) Prior Publication Data

US 2019/0053060 A1 Feb. 14, 2019

Related U.S. Application Data

(63) Continuation of application No. 13/817,707, filed as application No. PCT/KR2011/006159 on Aug. 19, 2011, now Pat. No. 10,136,328.

(30) Foreign Application Priority Data

Aug. 19, 2010 (IN) .......................... 2399/CHE/2010

(51) Int. Cl.
*H04W 16/00* (2009.01)
*H04L 1/00* (2006.01)
(Continued)

(52) U.S. Cl.
CPC ........... *H04W 16/00* (2013.01); *H04L 1/0026* (2013.01); *H04L 1/0027* (2013.01); *H04L 5/001* (2013.01); *H04W 24/02* (2013.01); *H04W 88/08* (2013.01)

(58) Field of Classification Search
None
See application file for complete search history.

(56) References Cited

U.S. PATENT DOCUMENTS 10,136,328 B2 * 11/2018 Baghel ................. H04W 16/00
2009/0245203 A1 10/2009 Pani et al.
(Continued)

FOREIGN PATENT DOCUMENTS

EP 2 502 456 A2 9/2012
EP 2 526 711 A1 11/2012
(Continued)

OTHER PUBLICATIONS

Ericsson; R2-104613; Introduction of Carrier Aggregation; Aug. 23-27, 2010 (server date: Aug. 17, 2010).
(Continued)

*Primary Examiner* — Ayaz R Sheikh
*Assistant Examiner* — Sori A Aga
(74) *Attorney, Agent, or Firm* — Jefferson IP Law, LLP (57) ABSTRACT

A method and an apparatus for activating and deactivating secondary cells in a carrier aggregation environment are provided. In one embodiment, a Medium Access Control (MAC) Control Element (CE) command is received from a base station for activating/deactivating a secondary cell associated with a User Equipment (UE). The secondary cell configured for the UE is activated/deactivated based on the MAC CE command. Further, a first uplink grant is received from the base station upon activation/deactivation of the secondary cell. Accordingly, quality information (e.g., chan-
(Continued)

US 10,791,465 B2

Page 2 nel quality information, sounding reference signal information, and the like) associated with the cell(s) is transmitted to the base station in the received first uplink grant over a physical uplink shared channel. Furthermore, a hybrid automatic repeat request entity associated with the secondary cell is reset.

12 Claims, 4 Drawing Sheets (51) Int. Cl.
*H04L 5/00* (2006.01)
*H04W 24/02* (2009.01)
*H04W 88/08* (2009.01)

(56) References Cited

U.S. PATENT DOCUMENTS

| 2010/0034176 | A1 | 2/2010 | Heo et al. | |
|---|---|---|---|---|
| 2010/0118723 | A1 | 5/2010 | Pani et al. | |
| 2010/0130219 | A1* | 5/2010 | Cave | H04W 72/02 455/450 |
| 2011/0134774 | A1 | 6/2011 | Pelletier et al. | |
| 2011/0243106 | A1* | 10/2011 | Hsu | H04L 5/0096 370/336 |
| 2011/0317652 | A1* | 12/2011 | Kim | H04L 5/001 370/329 |
| 2013/0163527 | A1 | 6/2013 | Lunttila et al. | |

FOREIGN PATENT DOCUMENTS

| EP | 2 637 332 A2 | 9/2013 |
|---|---|---|
| WO | 2011/063244 A2 | 5/2011 |
| WO | 2011/120448 A1 | 10/2011 |

OTHER PUBLICATIONS

ASUSTeK; Handling of DL HARQ processes upon deactivation; R2-104391; Aug. 23-27, 2010 (server date: Aug. 17, 2010).
Huawei; CQI/PMI/RI reporting for carrier aggregation; R1-103438; Jun. 28, 2010-Jul. 2, 2010 (server date: Jun. 22, 2010).
3GPP, '3rd Generation Partnership Project; Technical Specification Group Radio Access Network; Evolved Universal Terrestrial Radio Access (E-UTRA); Further advancements for E-UTRA physical layer aspects (Release 9).' 3GPP TR 36.814 V9.0.0, Mar. 2010. See sections 5-9.
3GPP, '3rd Generation Partnership Project; Technical Specification Group Radio Access Network; Evolved Universal Terrestrial Radio Access (E-UTRA); Multiplexing and channel coding (Release 9).' 3GPP TS 36.212 V9.2.0, Jun. 2010. See sections 4-5.
3GPP, '3rd Generation Partnership Project; Technical Specification Group Radio Access Network; Evolved Universal Terrestrial Radio Access (E-UTRA); Physical layer procedures (Release 9).' 3GPP TS 36.213 V9.2.0, Jun. 2010. See sections 6-10.
Indian Office Action dated Oct. 16, 2018, issued in the Indian Application No. 2399/CHE/2010.
Interdigital Communications, Release of PUCCH resources and removal of SCell Configuration, 3GPP Draft, R2-104814, XP050451955, Aug. 17, 2010, Madrid, Spain.
European Search Report dated Aug. 9, 2019, issued in the European Application No. 19181011.8.

* cited by examiner

METHODS AND APPARATUS FOR ACTIVATING AND DEACTIVATING SECONDARY CELLS IN A CARRIER AGGREGATION ENVIRONMENT

CROSS-REFERENCE TO RELATED APPLICATION(S)

This application is a continuation application of prior application Ser. No. 13/817,707, filed on Feb. 19, 2013, and claimed priority of a National Stage application under 35 U.S.C. § 371 of an International application filed on Aug. 19, 2011 and assigned application number PCT/KR2011/006159, and claims the benefit under 35 U.S.C. § 365(b) of an Indian patent application filed on Aug. 19, 2010 in the Indian Intellectual Property Office and assigned Serial No. 2399/CHE/2010, the entire disclosure of which is hereby incorporated by reference.

BACKGROUND OF THE INVENTION

1. Field of the Invention

The present invention relates to the field of carrier aggregation in a wireless communication system. More particularly, the present invention relates to an apparatus and method for activating and deactivating secondary cells in a carrier aggregation environment.

2. Description of the Related Art

Wireless communication systems are widely deployed to provide various communication services such as voice, video, packet data, broadcast, messaging, and so on. These systems may be multiple-access systems capable of supporting communication for multiple users by sharing the available system resources.

Recently, in wireless communication technologies such as Long Term Evolution (LTE)/LTE-Advanced (LTE-A), carrier aggregation has been introduced such that two or more component carriers are aggregated in order to support wider transmission bandwidths of up to 100 MHz. More specifically, carrier aggregation enables a User Equipment (UE) to aggregate a different number of cells comprising component carriers and different bandwidths in both uplink and downlink.

Typically, in a carrier aggregation environment, a UE can have more than one cell for data communication. In such a situation, one cell is a Primary cell (Pcell) and the remaining cells are Secondary cells (Scells). Both the Pcell and the Scells may have a downlink component carrier and an uplink component carrier. At any given time, the LTE network can add or remove one or more Scells to the UE based on data requirements. Similarly, the LTE network can activate one or more configured Scells from a deactivated state and vice versa based on data requirements. For example, an Scell configured for the UE is deactivated from the activated state due to non-use of the configured Scell for data communication as the unused Scell may consume a significant amount of battery power of the UE. The deactivated Scell may not be involved in any active data communication.

Typically, an enhanced-NodeB (eNB) communicates activation/deactivation of one or more Scells configured for use by the UE using a Medium Access Control (MAC) Control Element (CE) command. Thus, the UE activates/deactivates the one or more Scells upon receiving the MAC CE command from the eNB. When the MAC CE command is received by the UE, the UE sends a positive/negative acknowledgment (ACK/NACK). Usually, a Physical Uplink Control Channel (PUCCH) is used for transmission of ACK/NACK. However, when an uplink grant is available, ACK/NACK is sent over a Physical Uplink Shared Channel (PUSCH) since the PUSCH provides better transmission reliability as compared to the PUCCH.

If the eNB does not receive the ACK/NACK due to reliability issues, the eNB may consider that the UE has not received the MAC CE command. However, if the UE does receive the MAC CE command, the state of one or more Scells may remain unsynchronized between the UE and the eNB. For example, the eNB may transmit a MAC CE command for activating an Scell that is received by the UE, but the corresponding ACK/NACK may not be received by eNB. In such case, the eNB may incorrectly assume that the Scell is not activated at the UE due to failure to receive the ACK/NACK. This may result in significant loss of power at the UE. Similarly, if the MAC CE command is for deactivation of an Scell, the eNB may assume that the Scell is not deactivated at the UE even though the UE has deactivated the Scell, thereby causing a waste of network resources and scheduling errors. That is, the eNB is not sure of whether the UE has successfully received the MAC CE command for activating/deactivating one or more Scells.

Further, upon activation of an Scell at the UE, the eNB schedules data transmission over the activated Scell based on a set of parameters such as Channel Quality Information (CQI), Sounding Reference Signal (SRS), Power Head Room (PHR), etc. associated with the activated Scell. However, the set of parameters used for scheduling data transmission may not be up-to-date and usage of outdated parameters may affect performance of the eNB and cause a waste of network resources.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for activating and deactivating secondary cells in a carrier aggregation environment.

Another aspect of the present invention is to provide a method and apparatus for activating and deactivating secondary cells in a carrier aggregation environment. In an exemplary implementation, a Medium Access Control (MAC) Control Element (CE) command is received from a base station for activating/deactivating a secondary cell associated with a User Equipment (UE). Then, the secondary cell configured for the UE is activated/deactivated based on the MAC CE command. Further, a first uplink grant is received from the base station upon activation/deactivation of the secondary cell. Accordingly, quality information (e.g., channel quality information, sounding reference signal information, and the like) associated with the cell(s) is transmitted to the base station in the received first uplink grant over a physical uplink shared channel. Furthermore, a hybrid automatic repeat request entity associated with the secondary cell is reset.

In accordance with an aspect of the present invention, a method for activating/deactivating a secondary cell at a User Equipment (UE) in a communication system based on carrier aggregation is provided. The method includes determining whether at least one secondary cell configured for the UE is activated, determining whether transmission of quality information associated with the at least one secondary cell is triggered if the at least one secondary cell is activated, and transmitting the quality information to a base station if the transmission of the quality information is triggered.

In accordance with another aspect of the present invention, a method for activating/deactivating a secondary cell at a base station in a communication system based on carrier aggregation is provided. The method includes determining whether at least one secondary cell configured for a UE is activated, determining whether transmission of quality information associated with the at least one secondary cell is triggered if the at least one secondary cell is activated and, if the transmission of the quality information is triggered, receiving the quality information from the UE.

In accordance with another aspect of the present invention, a UE for activating/deactivating a secondary cell in a communication system based on carrier aggregation is provided. The UE includes a controller for determining whether at least one secondary cell configured for the UE is activated, for determining whether transmission of quality information associated with the at least one secondary cell is triggered if the at least one secondary cell is activated, and for controlling a transceiver to transmit the quality information to a base station if transmission of the quality information is triggered.

In accordance with another aspect of the present invention, a base station for activating/deactivating a secondary cell in a communication system based on carrier aggregation is provided. The base station includes a controller for determining to activate of at least one secondary cell configured for a UE, for determining whether transmission of quality information associated with the at least one secondary cell is triggered if the at least one secondary cell is activated, and for controlling a transceiver to receive the quality information from the UE if the transmission of the quality information is triggered.

BRIEF DESCRIPTION OF DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for activating and deactivating secondary cells in a carrier aggregation environment. In the following description, reference is made to the accompanying drawings that form a part hereof, and in which are shown by way of illustration exemplary embodiments in which the invention may be practiced. These exemplary embodiments are described in sufficient detail to enable those skilled in the art to practice the invention, and it is to be understood that other embodiments may be utilized and that changes may be made without departing from the scope of the present invention. The following description is, therefore, not to be taken in a limiting sense, and the scope of the present invention is defined only by the appended claims.

Figure 1:
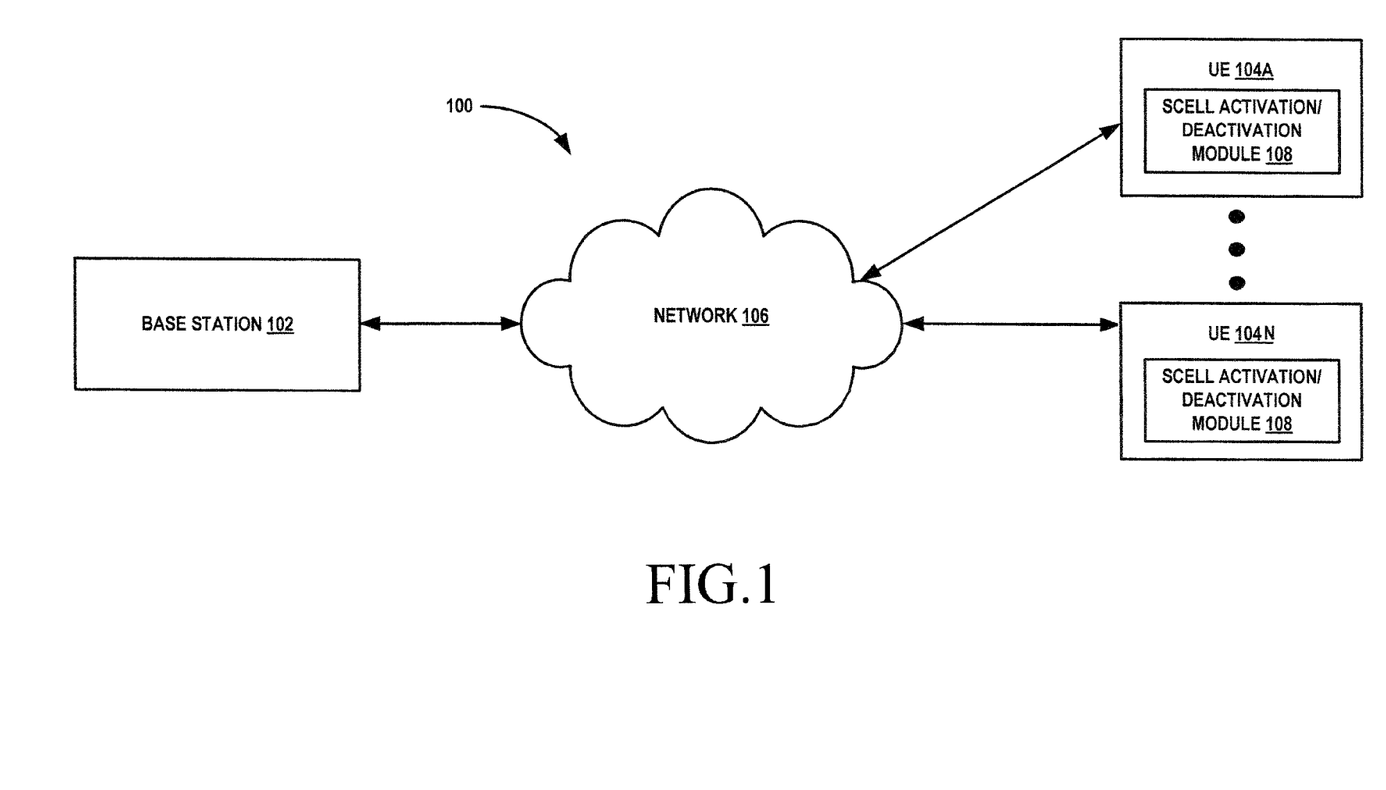
FIG. 1 illustrates a block diagram of a carrier aggregation system capable of handling activation/deactivation of a secondary cell configured for a User Equipment (UE), according to an exemplary embodiment of the present invention.

FIG. 1 illustrates a block diagram of a carrier aggregation system capable of handling activation/deactivation of a secondary cell configured for a User Equipment UEs, according to an exemplary embodiment of the present invention.

Referring to FIG. 1, a carrier aggregation system 100 includes a base station 102, UEs 104A-N, and a network 106. The UEs 104A-N may be mobile stations, laptops, cell phones, tablets, and the like. Each of the UEs 104A-N includes a Secondary cell (Scell) activation/deactivation module 108. The base station 102 and the UEs 104A-N are connected wirelessly via the network 106.

The base station 102 has configured a Primary cell (Pcell) and an Scell for the UE 104A. For purposes of explanation, it is assumed that the Pcell is in an activated state and the Scell is in a deactivated state. Based on data transmission requirements, the base station 102 may activate the Scell associated with the UE 104A from the deactivated state. In an exemplary operation, the base station 102 sends a Medium Access Control (MAC) Control Element (CE)

command for activating the Scell. The Scell activation/ deactivation module 108 activates the Scell based on the MAC CE command.

Upon activation of the Scell, quality information (e.g., Channel Quality Information (CQI), Sounding Reference Signal (SRS) information, Power Head Room (PHR), etc.) associated with the cell is triggered by the Scell activation/ deactivation module 108. Accordingly, the Scell activation/ deactivation module 108 transmits the quality information to the base station 102 at a first uplink grant available upon activation of the Scell over a Physical Uplink Shared CHannel (PUSCH). The quality information received at the base station 102 indicates that the Scell is activated at the UE 104A. Also, the quality information received upon activation of the Scell enables the base station 102 to schedule data transmission based on up-to-date quality information. In an exemplary implementation, the above described process is also applicable for deactivation of the Scell from the activated state. The following description of FIGS. 2 and 3 includes various methods associated with activation/deactivation of one or more Scells associated with a UE in greater detail.

Figure 2:
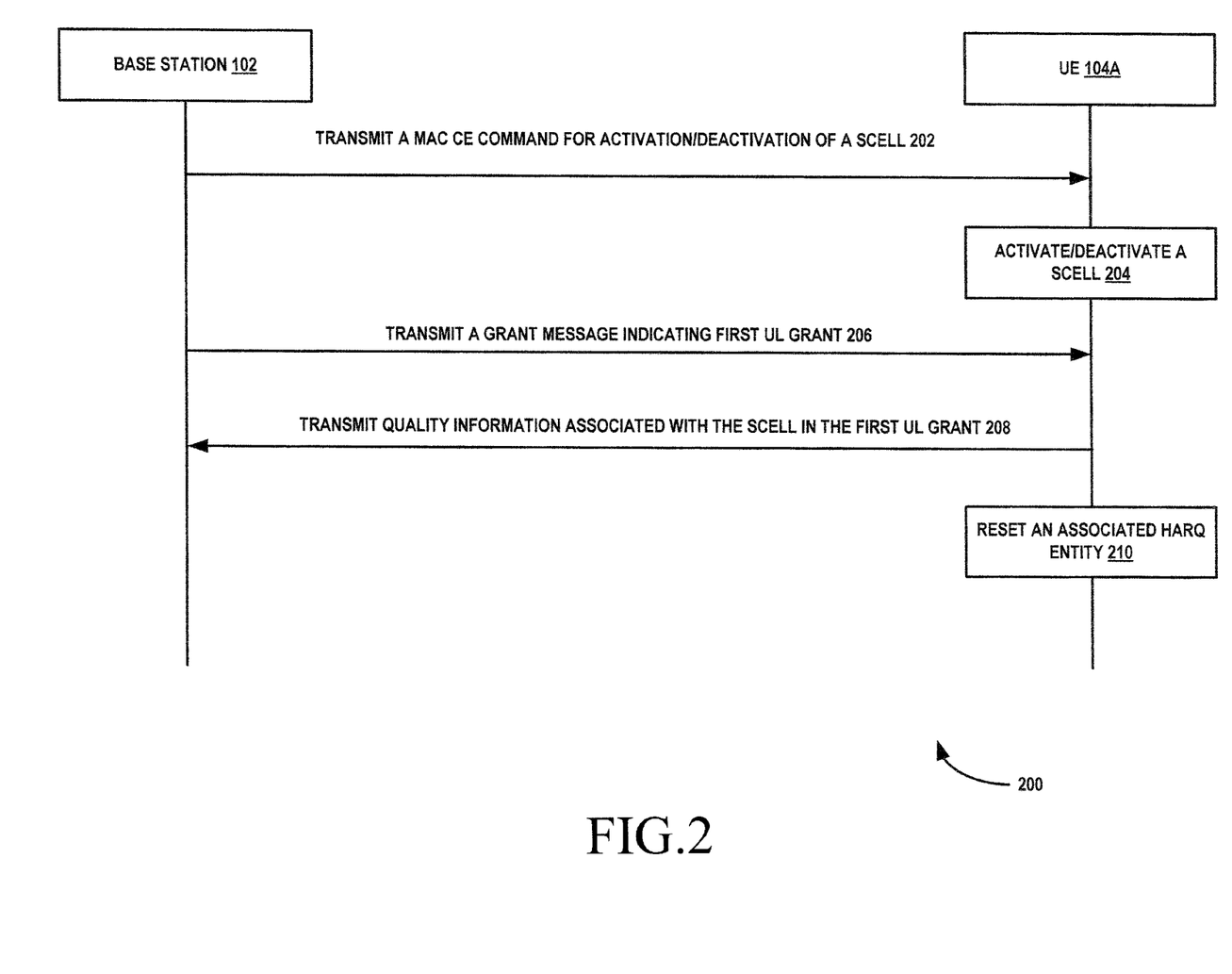
FIG. 2 is a flow diagram illustrating a method of activating/deactivating a secondary cell configured for a UE in a carrier aggregation environment, according to an exemplary embodiment of the present invention.

FIG. 2 is a flow diagram illustrating a method of activating/deactivating an Scell configured for a UE in a carrier aggregation environment, according to an exemplary embodiment of the present invention.

Referring to FIG. 2, the base station 102 transmits a MAC CE command for activation/deactivation of an Scell configured for use by the UE 104A at step 202. At step 204, the UE 104A activates/deactivates the Scell associated the UE 104A based on the MAC CE command. At step 206, the base station 102 transmits a grant message indicating a first uplink grant allocated to the UE 104A.

At step 208, the UE 104A transmits quality information associated with the cell in the first uplink grant over a PUSCH. The quality information may include CQI, SRS information, and PHR information for the cell. In an exemplary embodiment, the quality information associated with the cell is triggered when the Scell is activated and/or deactivated. For example, when the UE 104A activates/ deactivates the Scell as per the MAC CE command, aperiodic CQI and/or aperiodic/periodic SRS information is triggered at the UE 104A.

In another exemplary embodiment, the base station 102 may send a quality information trigger substantially simultaneously with the MAC CE command in a transport block over the PUSCH. In this exemplary embodiment, the quality information is triggered based on the quality information trigger received in the transport block. For example, when the quality information trigger is an aperiodic CQI trigger, the UE 104A transmits CQI associated with the cell. Alternatively, the UE 104A transmits SRS information associated with uplink quality of the cell when the quality information trigger is an aperiodic SRS trigger. Thus, the quality information transmitted in the first uplink grant helps the base station 102 to accurately schedule data transmission. Also, the quality information received at the base station 102 indicates that the UE 104A has received the MAC CE command and activated/deactivated the Scell based on the MAC CE command. In other words, if the quality information is not received in the first uplink grant, the base station 102 determines that the UE 104A has not received the MAC CE command and hence re-transmits the MAC CE command.

At step 210, the UE 104A resets a Hybrid Automatic Repeat reQuest (HARQ) entity associated with the Scell. In an exemplary embodiment, the UE 104A clears HARQ buffers associated with one or more HARQ processes upon activation/deactivation of the Scell in uplink and/or downlink. In another exemplary embodiment, when the corresponding Scell is deactivated in uplink, the UE 104A clears HARQ buffers associated with the HARQ processes and sets New Data Indicators (NDIs) associated with the HARQ processes to a value of '0'. Additionally, the UE 104A reinitializes state variables of the HARQ processes. Also, for each of the downlink HARQ processes, the UE 104A considers a next received data transmission as a first data transmission.

Figure 3:
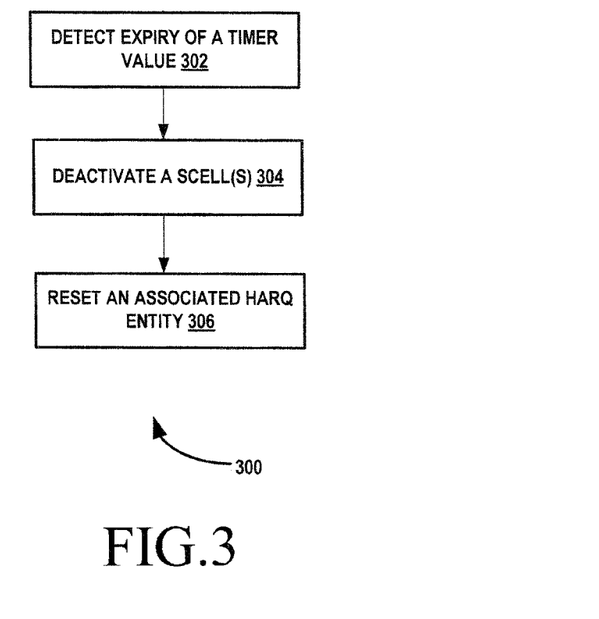
FIG. 3 is a flow diagram illustrating a method of activating/deactivating a secondary cell configured for a UE in the carrier aggregation environment, according to another exemplary embodiment of the present invention.

FIG. 3 is a flow diagram illustrating a method of deactivating an Scell configured for a UE in a carrier aggregation environment, according to another exemplary embodiment of the present invention.

Referring to FIG. 3, the UE 104A detects expiry of a timer value associated with a timing advance timer at step 302. At step 304, the UE 104A deactivates the Scell associated the UE 104A when the timer value is expired.

At step 306, the UE 104A resets a HARQ entity associated with the Scell. When the corresponding Scell is deactivated in uplink, the UE 104A clears HARQ buffers associated with the HARQ processes and sets NDIs associated with the HARQ processes to a value of '0'. Additionally, the UE 104A reinitializes state variables of the HARQ processes.

Figure 4:
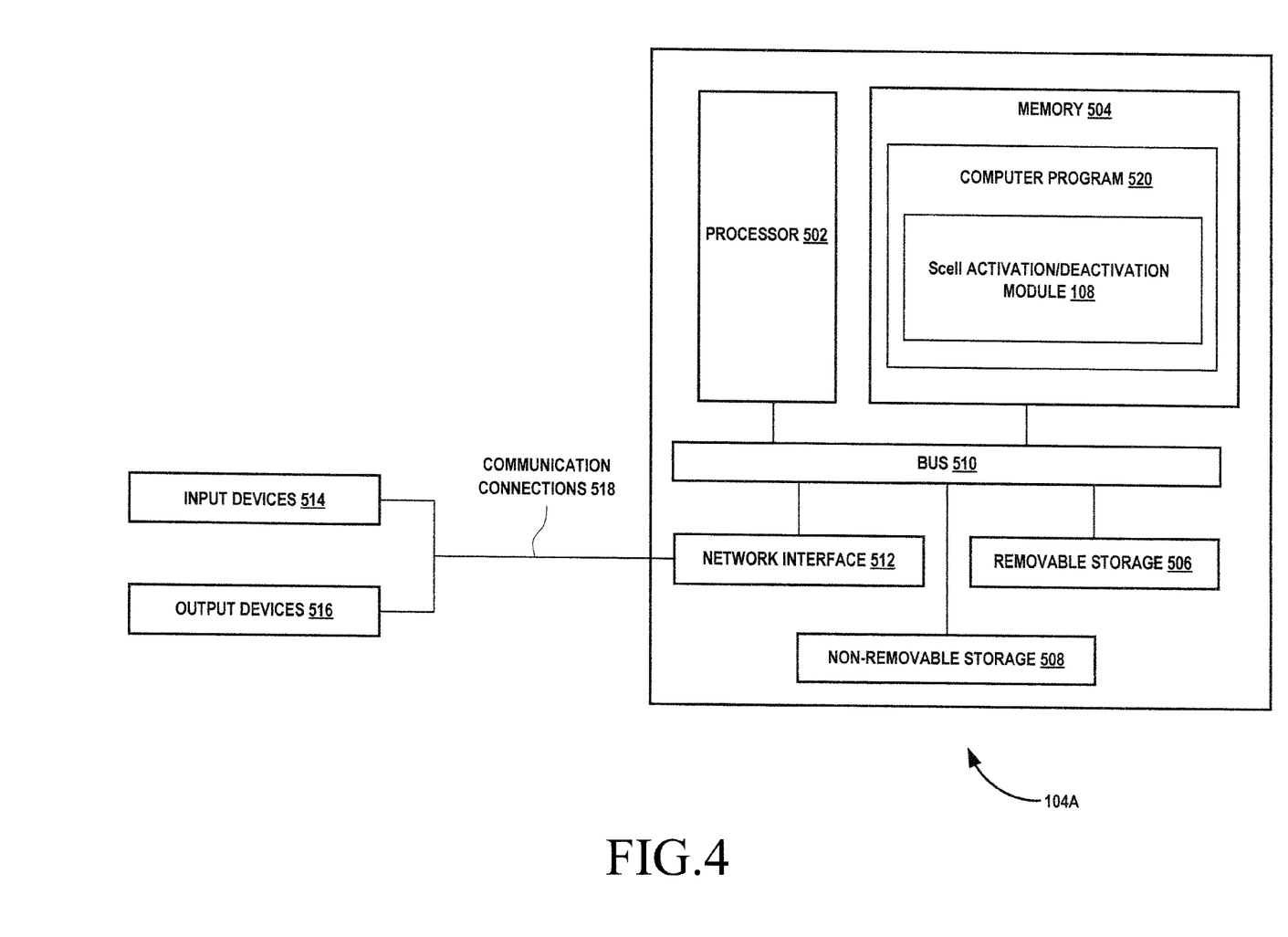
FIG. 4 shows a UE according to an exemplary embodiment of the present invention.

FIG. 4 shows a UE according to an exemplary embodiment of the present invention.

It is to be understood that FIG. 4 and the following discussion are intended to provide a brief, general description of a UE in which exemplary embodiments of the inventive concepts contained herein may be implemented.

Referring to FIG. 4, the UE 104A may include a processor 502, memory 504, a removable storage 506, and a non-removable storage 508. The UE 104A additionally includes a bus 510 and a network interface 512. The UE 104A may include or have access to one or more user input devices 514, one or more output devices 516, and one or more communication connections 518 such as a network interface card or a universal serial bus connection. The one or more user input devices 514 may be a keypad, a mouse pad, and the like. The one or more output devices 516 may be a display of the UE 104A. The communication connections 518 may include a wireless communication network such as Long Term Evolution (LTE).

A variety of computer-readable storage media may be stored in and accessed from the memory elements of the UE 104A, the removable storage 506 and the non-removable storage 508. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, memory sticks, and the like.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, smart cards, and the like.

Exemplary embodiments of the present application may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 502 of the UE 104A. For example, a computer program 520 may include the Scell activation/deactivation module 108 capable of performing activating and deactivating of Scells in a carrier aggregation environment and associated procedures, according to the teachings and herein described exemplary embodiments of the present subject matter. In one exemplary embodiment, the computer program 520 may be included on a Compact Disk-Read Only Memory (CD-ROM) and loaded from the CD-ROM to a hard drive in the memory 504. The Scell activation/deactivation module 108 may cause the UE 104A to perform various functions according to the various exemplary embodiments of the present subject matter.

While, the present invention has been described with reference to certain exemplary embodiments, it will be evident that various modifications and changes may be made to these exemplary embodiments without departing from the broader spirit and scope of the invention. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for activating/deactivating a secondary cell at a user equipment (UE) in a communication system based on carrier aggregation, the method comprising:
    activating at least one secondary cell in response to receiving, from a base station, control information for activating/deactivating the at least one secondary cell;
    receiving, from the base station, an uplink grant which is firstly available after activation of the at least one secondary cell;
    transmitting quality information to the base station in response to the uplink grant, wherein the quality information indicates to the base station that the at least one secondary cell is activated at the UE, and enables the base station to schedule data transmission;
    detecting an expiry of a timer related to a deactivation of the at least one secondary cell;
    deactivating the at least one secondary cell in response to the expiry of the timer;
    flushing hybrid automatic repeat request (HARQ) buffers associated with one or more HARQ processes when the least one secondary cell is deactivated;
    stopping any uplink transmission on the at least one secondary cell in response to deactivating the at least one secondary cell; and
    receiving the control information which is retransmitted by the base station in response to the base station not receiving the quality information.

2. The method of claim 1, further comprising:
    resetting a hybrid automatic repeat request (HARQ) entity associated with the at least one secondary cell upon deactivating the at least one secondary cell.

3. The method of claim 1, wherein the quality information comprises at least one of channel quality information (CQI), sounding reference signal (SRS), or a Power Head Room (PHR).

4. A method for activating/deactivating a secondary cell at base station in a communication system based on carrier aggregation, the method comprising:
    transmitting, to a user equipment (UE), control information for activating/deactivating at least one secondary cell,
    transmitting, to the UE, an uplink grant which is firstly available by the UE after activation of the at least one secondary cell;
    in response to receiving quality information associated with the at least one secondary cell from the UE in response to the uplink grant:
        identifying the activation of the at least one secondary cell based on the quality information received in response to the uplink grant which is firstly available after the activation of the at least one secondary cell; and
        scheduling data transmission based on the quality information, and in response to not receiving the quality information, retransmitting the control information to the UE,
    wherein the at least one secondary cell is activated by the UE using the control information,
    wherein the at least one secondary cell is deactivated by the UE in response to an expiry of a timer related to a deactivation of the at least one secondary cell,
    wherein hybrid automatic repeat request (HARQ) buffers associated with one or more HARQ processes are flushed by the UE when the least one secondary cell is deactivated, and
    wherein any uplink transmission from the UE on the at least one secondary cell is stopped in response to deactivating the at least one secondary cell.

5. The method of claim 4, wherein a hybrid automatic repeat request (HARQ) entity associated with the at least one secondary cell is reset by the UE upon deactivating the at least one secondary cell.

6. The method of claim 4, wherein the quality information comprises at least one of channel quality information (CQI), sounding reference signal (SRS), or a Power Head Room (PHR).

7. A user equipment (UE) for activating/deactivating a secondary cell in a communication system based on carrier aggregation, the UE comprising:
    a transceiver; and
    a controller coupled to the transceiver, wherein the controller is configured to:
        activate at least one secondary cell in response to receiving, from a base station, control information for activating/deactivating the at least one secondary cell,
        receive, from the base station, an uplink grant which is firstly available after activation of the at least one secondary cell,
        transmit quality information to the base station in response to the uplink grant, wherein the quality information indicates to the base station that the at least one secondary cell is activated at the UE, and enables the base station to schedule data transmission, detect an expiry of a timer related to a deactivation of the at least one secondary cell, deactivate the at least one secondary cell in response to the expiry of the timer, flush hybrid automatic repeat request (HARQ) buffers associated with one or more HARQ processes when the least one secondary cell is deactivated, stop any uplink transmission on the at least one secondary cell in response to deactivating the at least one secondary cell, and receive the control information which is retransmitted by the base station in response to the base station not receiving the quality information.

8. The UE of claim 7, wherein the controller is further configured to:

reset a hybrid automatic repeat request (HARQ) entity associated with the at least one secondary cell upon deactivating the at least one secondary cell.

9. The UE of claim 7, wherein the quality information comprises at least one of channel quality information (CQI), sounding reference signal (SRS), or a Power Head Room (PHR).

10. A base station for activating/deactivating a secondary cell at base station in a communication system based on carrier aggregation, the base station comprising:

a transceiver; and a controller coupled to the transceiver, wherein the controller is configured to:

transmit, to a user equipment (UE), control information for activating/deactivating at least one secondary cell, transmit, to the UE, an uplink grant which is firstly available by the UE after activation of the at least one secondary cell, in response to receiving quality information associated with the at least one secondary cell from the UE in response to the uplink grant:

identify the activation of the at least one secondary cell based on the quality information received in response to the uplink grant which is firstly available after the activation of the at least one secondary cell, and schedule data transmission based on the quality information, and in response to not receiving the quality information, retransmit the control information to the UE, wherein the at least one secondary cell is activated by the UE using the control information, wherein the at least one secondary cell is deactivated by the UE in response to an expiry of a timer related to a deactivation of the at least one secondary cell, wherein hybrid automatic repeat request (HARQ) buffers associated with one or more HARQ processes are flushed by the UE when the least one secondary cell is deactivated, and wherein any uplink transmission from the UE on the at least one secondary cell is stopped in response to deactivating the at least one secondary cell.

11. The base station of claim 10, wherein a hybrid automatic repeat request (HARQ) entity associated with the at least one secondary cell is reset by the UE upon deactivating the at least one secondary cell.

12. The base station of claim 10, wherein the quality information comprises at least one of channel quality information (CQI), sounding reference signal (SRS), or a Power Head Room (PHR).

* * * * *